P. C. HEWITT.
VAPOR ELECTRIC APPARATUS.
APPLICATION FILED OCT. 23, 1915.
1,198,381.
Patented Sept. 12, 1916.
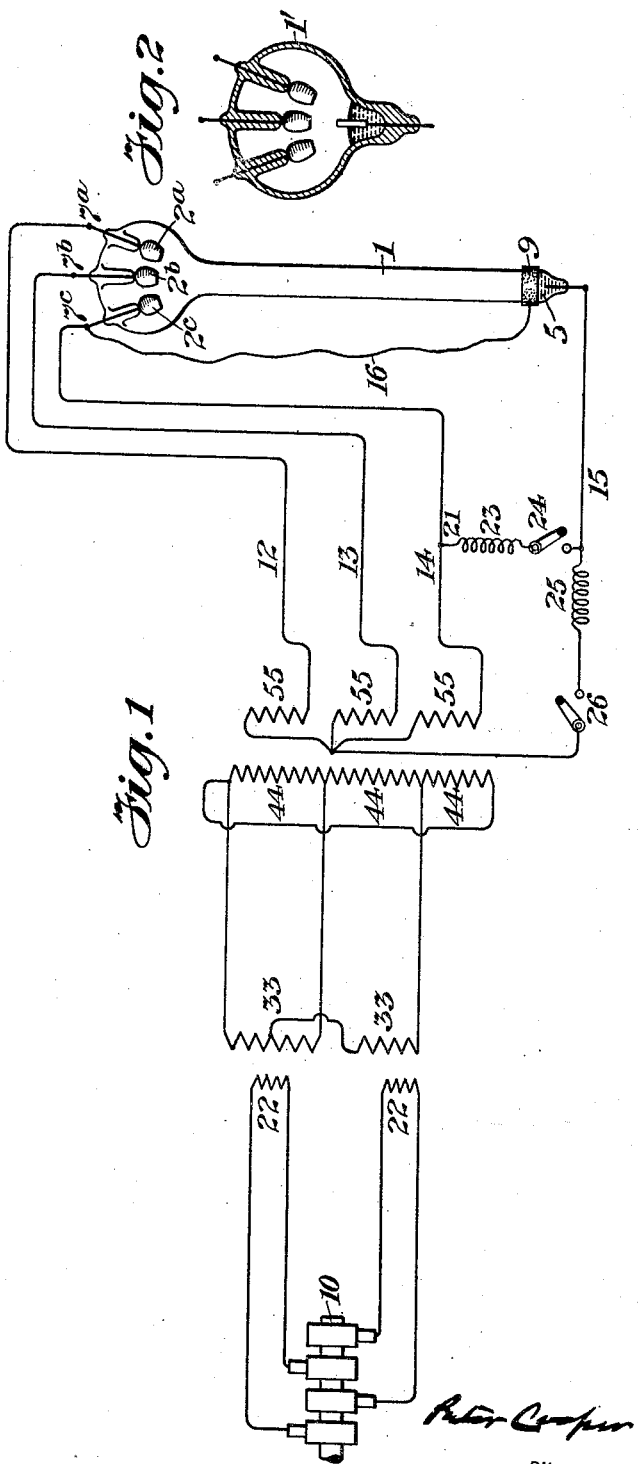

UNITED STATES PATENT OFFICE.

PETER COOPER HEWITT, OF RINGWOOD MANOR, NEW JERSEY, ASSIGNOR TO COOPER HEWITT ELECTRIC COMPANY, OF HOBOKEN, NEW JERSEY, A CORPORATION OF NEW JERSEY.

VAPOR ELECTRIC APPARATUS.

1,198,381.

Specification of Letters Patent.

Patented Sept. 12, 1916.

Original application filed February 20, 1902, Serial No. 94,871. Renewed April 11, 1904, Serial No. 202,669. Divided and application filed April 3, 1911, Serial No. 618,651. Divided and this application filed October 23, 1915. Serial No. 57,406.

*To all whom it may concern:*

Be it known that I, PETER COOPER HEWITT, a citizen of the United States, and resident of Ringwood Manor, county of Passaic, State of New Jersey, have invented certain new and useful Improvements in Vapor Electric Apparatus, of which the following is a specification.

In certain applications of the United States filed on the 5th day of April, 1901, and bearing respectively the Serial Numbers 54,484 and 54,485, I show and describe a method and apparatus relating to the employment of a form of gas or vapor electric lamp in connection with a source of polyphase alternating current. The device shown and described in these applications is provided with three positive electrodes and a single negative electrode, the positive electrodes being respectively connected to the terminals of a source of three-phase alternating current, while the negative electrode is connected to the neutral point of the source.

In the apparatus disclosed in the applications referred to, a positive electrode is supplied for each phase of the polyphase alternating current, the several electrodes being successively introduced into the lamp circuit coincidently with the alternations of the current. In the description forming part of the applications, it is pointed out that at the negative electrode there exists an initial resistance to the entrance of the current, but once this resistance is overcome, as by the application of a starting current of relatively high potential, the lamp will be traversed continuously by the electric current under the influence of a more moderate electro-motive-force, as this resistance only exists in the initial passage of the current.

In order to take advantage of the conditions already existing in matters of electrical distribution, I now propose to derive current from the two-phase systems already widely established and transform the current into a three-phase alternating current, applying the three-phase current to the lamp after such transformation, or a polyphase current which approximates a three-phase sine wave current.

In operating the lamp continuously, it is necessary that the current should always pass through the lamp in the same direction. Otherwise, the negative electrode resistance referred to above would prevent the passage of a reverse current. With the ordinary two-phase current, there are intervals in the operation during which no electro-motive-force is impressed in a given direction. In order, therefore, to be able to utilize such a two-phase current, it is necessary to transform the current into a polyphase current such as will permit a continuous flow in the same direction, and for this purpose the three-phase current seems to be especially adapted. By means of the device illustrated herein, I provide a rectifier for the three-phase current (whether used for lighting purposes or not), whereby the passage of the current is restricted to one direction through the rectifying device, and the flow of the current in the line leading to the negative electrode is also in one direction, while the flow of current to the positive electrode is intermittent as regards any selected electrode.

The passage of the current as described may be utilized for the production of light in an electric gas or vapor lamp, or, if desired, an inclosed gas or vapor lamp may be utilized for rectifying purposes without transforming the current into light.

I have illustrated my invention in the accompanying drawings, in which—

Figure 1 illustrates diagrammatically the general organization of the system forming the subject of the present invention, showing also means for transforming the current into electric light; and Fig. 2 shows a rectifier capable of use in the illustrated system without the production of light for illuminating purposes.

Referring to Fig. 1 of the drawing, 10 is a suitable source of two-phase alternating electric currents, and 22, 22, are the primaries of two-phase electric transformers supplied by the said source. The secondaries of the said transformers are shown at 33, 33, and these secondaries constitute a source of supply for the primaries 44, 44, 44, of a three-phase circuit which is represented diagrammatically in the drawing. The elements of the primaries 44, 44, 44, may be arranged in delta form and may act on secondaries, 55, 55, 55, arranged in star form. The inclosing chamber of the lamp is shown at 1, the same being composed of glass or other suitable transparent material. The respective positive electrodes are shown at $2^a$, $2^b$ and $2^c$, while the negative electrode appears at 5, being here shown as consisting essentially of a small body of mercury. The positive electrodes $2^a$, $2^b$ and $2^c$, are respectively connected by means of wires, 12, 13 and 14, with the terminals of the transformer secondaries, 55, 55, 55, and the negative electrode 5 is joined by a wire 15, to the neutral point 56 of the transformer. For the purpose of starting the lamp, I usually surround the portion of the lamp adjacent to the negative electrode with a conducting band, 9, connected by a wire 16, with either of the positive leading-in wires $7^a$, $7^b$, $7^c$, or I may connect it to earth by any suitable means. This aids in starting the lamp.

In order to provide a starting impulse of higher potential than that on which the lamp is to be operated (such a starting impulse having been found convenient for causing the initial operation of the lamp), I provide a shunt, 21, around the lamp between the negative side 15, and either one of the positive wires 12, 13 or 14, and include in the said shunt the resistance 23 and a switch 24. In the present instance I connect the shunt across between the wires 14 and 15. In the wire 15, I include a coil, 25, and a switch 26.

There will be no danger of current passing from one of the positive electrodes to the other in the lamp illustrated in the drawings, since each positive is a negative with relation to each of the other positive electrodes, and so long as the negative electrode at the opposite end of the tube is broken down by the initial or starting impulse, the current will find less resistance in passing through the length of the tube than it would in attempting to pass from one positive electrode to either of the others.

The switch 26 being closed it is only necessary in order to start the lamp that the described shunt should be closed through the medium of the switch 24 and then quickly broken, usually through the medium of the same switch, whereupon an impulse of higher potential is caused to traverse the tube 1 with its contained gas or vapor, and the lamp starts into operation.

The switch 24 will usually be a snap or quick-break switch adapted to cause a sudden rupture of the circuit and thus produce the quick impulse described.

In Fig. 2, I show the container 1' of globular or bulbous form, the relations being such that under ordinary conditions no light will be developed in the gases or vapors inclosed within the container. With a structure such as shown in Fig. 2 inserted in place of the lamp illustrated in Fig. 1, three-phase currents would be rectified, but not converted into luminous vibrations.

This application is a division of my application, Serial Number 618,651, filed April 3rd, 1911, which, in turn, is a division of my application Serial Number 94,871, filed February 20th, 1902, renewed April 11th, 1904, Serial Number 202,669.

I am aware of the issuance to myself of United States Patent No. 1,156,227, the application for which was filed on the 14th of August, 1907. One of the objects sought in the invention set forth in said patent was that of reducing materially below fourteen volts the normal drop in potential between a positive electrode and a cathode or negative electrode of a vapor rectifier. To accomplish the result aimed at, I located and supported the positive electrode within the region in which the negative electrode component of the total fall of potential occurs. Otherwise expressed, the positive electrode was located within the "dark space" adjacent to the negative electrode or cathode. The invention of the present application is applicable to rectifiers of the usual or a very common type, wherein the normal drop of potential between electrodes of opposite polarity ranges somewhere from about 14 to about 20 volts. The positive electrode in this case is located outside the critical region which is limited by the negative electrode and the region adjacent to it, of approximately the same potential. In other words, the positive electrode lies outside the so-called dark space.

I claim as my invention:

1. A rectifier for alternating electric current comprising an evacuated chamber, positive electrodes and a common negative electrode, or cathode therein, the positive electrodes being located outside the dark space adjacent to the cathode and the diameter of a cross-section of the container through the conducting path being greater than the distance between the positive and negative electrodes.

2. A rectifier for alternating electric currents comprising an evacuated chamber, a positive and a negative electrode or cathode therein, the positive electrode being located outside the dark space adjacent to the cathode and the diameter of a cross-section of the container through the conducting path to the electrodes being greater than the distance between the positive and negative electrodes.

3. A vapor electric device comprising an evacuated chamber and electrodes of opposite polarity therein, the positive polarity constituent being outside the dark space adjacent to the cathode and the diameter of a cross-section of the chamber through the conducting path being greater than the distance between the electrodes of opposite polarity.

4. An electric apparatus comprising an evacuated container, a positive and a negative electrode or cathode therein, the positive electrode being located outside the region in which the negative electrode component of the total fall of potential occurs, and the distance between the electrodes being less than the diameter of a cross-section of the container through the conducting path.

5. An electric apparatus comprising an evacuated container, positive electrodes and a negative electrode or cathode therein, the positive electrode being located outside the region in which the negative electrode component of the total fall of potential occurs, and the distance between the electrodes being less than the diameter of a cross-section of the container through the conducting path.

Signed at New York in the county of New York and State of New York this 20th day of October A. D. 1915.

PETER COOPER HEWITT.

Witnesses:
 WALTER E. F. BRADLEY,
 RAYNER M. BEDELL.